United States Patent [19]
VanDervort

[11] Patent Number: 5,812,528
[45] Date of Patent: Sep. 22, 1998

[54] MEASURING ROUND TRIP TIME IN ATM NETWORK VIRTUAL CONNECTIONS

[75] Inventor: Cole S. VanDervort, Frederick, Md.

[73] Assignee: Telecommunications Techniques Corporation, Gaithersburg, Md.

[21] Appl. No.: 560,285

[22] Filed: Nov. 17, 1995

[51] Int. Cl.$^6$ ................................ H04J 3/14; H04L 12/56
[52] U.S. Cl. ........................ 370/235; 370/249; 370/396
[58] Field of Search .................................... 370/230, 231, 370/232, 235, 236, 249, 250, 252, 253, 389, 392, 395, 396, 400

[56] References Cited

U.S. PATENT DOCUMENTS

| 5,179,549 | 1/1993  | Joos et al.        | 370/232 |
|-----------|---------|--------------------|---------|
| 5,216,669 | 6/1993  | Hofstetter et al.  | 370/396 |
| 5,251,204 | 10/1993 | Izawa et al.       | 370/249 |
| 5,265,088 | 11/1993 | Takigawa et al.    | 370/249 |
| 5,271,000 | 12/1993 | Engbersen et al.   | 370/244 |
| 5,311,513 | 5/1994  | Ahmadi et al.      | 370/230 |
| 5,313,455 | 5/1994  | van der Wal et al. | 370/232 |
| 5,339,332 | 8/1994  | Kammerl            | 370/253 |
| 5,343,463 | 8/1994  | van Tetering et al.| 370/253 |
| 5,390,174 | 2/1995  | Jugel              | 370/392 |
| 5,402,426 | 3/1995  | Foglar et al.      | 370/232 |
| 5,414,701 | 5/1995  | Shtayer et al.     | 370/395 |
| 5,422,838 | 6/1995  | Lin                | 365/49  |
| 5,450,394 | 9/1995  | Gruber et al.      | 370/253 |
| 5,457,700 | 10/1995 | Merchant           | 370/253 |
| 5,467,342 | 11/1995 | Logston et al.     | 370/253 |
| 5,477,531 | 12/1995 | McKee et al.       | 370/249 |
| 5,563,875 | 10/1996 | Hefel et al.       | 370/249 |

FOREIGN PATENT DOCUMENTS 0231967   8/1987   European Pat. Off. .

OTHER PUBLICATIONS

Tekelec Corporation, "ATM Pocket Guide", Publication No. 908–0119–01, Revision B, Aug. 1994.

*Primary Examiner*—Alpus H. Hsu
*Attorney, Agent, or Firm*—Michael de Angeli

[57] ABSTRACT

Round trip travel time of cells in an asynchronous transfer mode (ATM) communication network is measured by injecting a time stamp into test cells in a first test instrument, transmitting these test cells to a remote node in the network, looping the test cells back from the remote node to an originating node, and detecting their arrival. Preferably the time stamps are injected into test cells configured as OAM-PM (operation, administration, and maintenance performance management) cells. A time-of-departure stamp is injected into the payload of the test cell on transmission, and a time-of-arrival time stamp is appended upon its receipt. The time-of-arrival and time of departure time stamps are compared to determine the actual round trip travel time of the cell within the network. This information can then be used to optimize network traffic flow, especially for available bit rate virtual connections.

15 Claims, 3 Drawing Sheets

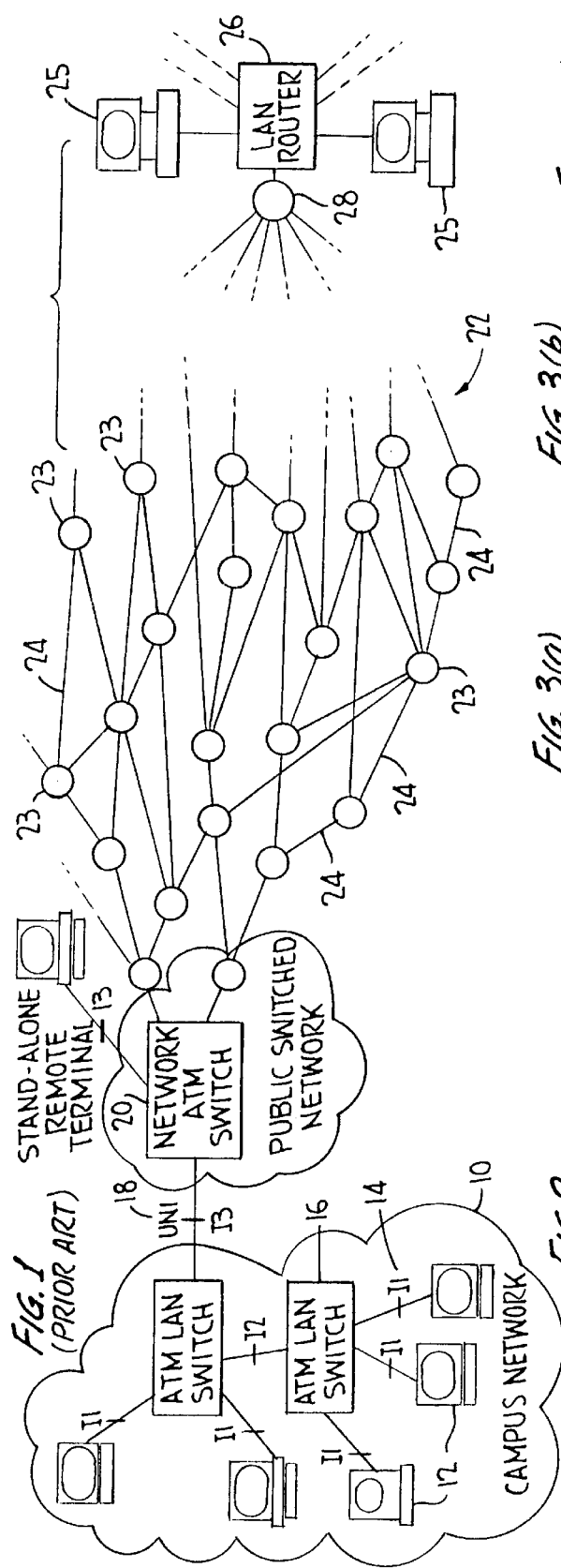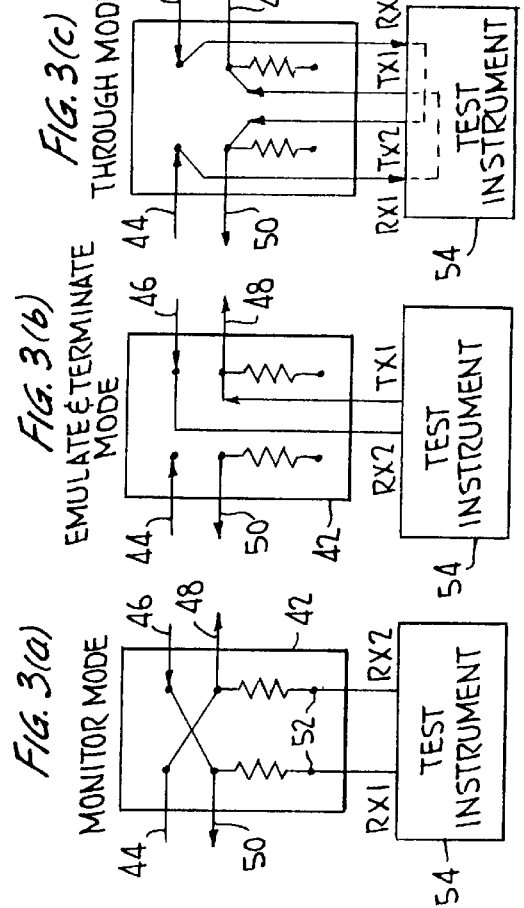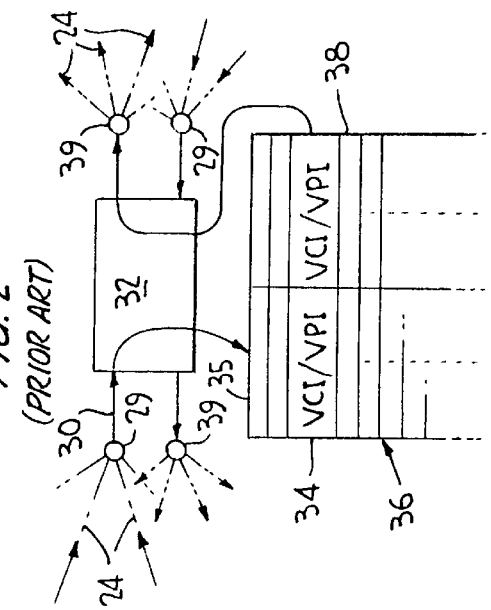

LEGEND:
GFC = GENERIC FLOW CONTROL      PTI = PAYLOAD TYPE IDENTIFIER
VPI = VIRTUAL PATH IDENTIFIER    CLP = CELL LOSS PRIORITY
VCI = VIRTUAL CHANNEL IDENTIFIER HEC = HEADER ERROR CONTROL

MEASURING ROUND TRIP TIME IN ATM NETWORK VIRTUAL CONNECTIONS

CROSS-REFERENCE TO RELATED APPLICATIONS

This application is one of four co-pending applications having generally related subject matter, that is, test instruments and methods for performing testing and measurement functions in ATM networks. The four applications are as follows: Ser. No. 08/560,117, filed , Nov. 17, 1995 for "Rate-Matched Cell Identification and Modification, Replacement, or Insertion for Test and Measurement of ATM Network Virtual Connections" Ser. No. 08/560,285, filed Nov. 17, 1985 for "Measuring Round Trip Time in ATM Network Virtual Connections" Ser. No. 08/563,552, filed Nov. 28, 1995 for "Statistics Collection for ATM Networks" Ser. No. 08/560,286, filed Nov. 17, 1995 for "Measuring Burst Rate and Burst Size in ATM Network Virtual Connections". The disclosures of the other three applications are incorporated herein by reference.

1. Field of the Invention

This invention relates to a test instrument and methods of its use for testing operation of asynchronous transfer mode (ATM) communication networks. More particularly, the invention relates to instruments and methods for measuring cell round trip time within an ATM communication network, particularly with respect to available bit rate virtual connections.

2. Background of the Invention

With the increase in use of computing facilities throughout modern society, and in particular with increased communication over optical fiber-linked networks having far higher transmission speeds than previous conductive wire connections, there is substantial interest in new methods of communication. More particularly, previous communication tended to be segregated between voice and data communication, with different networks being provided for each. Typically voice communication took place over the telephone system, while high speed data communication took place over dedicated lines; data communication is also possible in the telephone system, but only at substantially slower rates than provided by dedicated lines. More recently, digital video and image communications have become of increased interest, particularly for so-called multimedia applications.

The result is that substantial improvements in flexibility of communication techniques are needed, in particular, to permit convenient future upgrading of communication facilities over time as additional data sources become available. Still more specifically, it is imperative that standards be developed and implemented allowing voice, video, images, and data to be transmitted more or less interchangeably over varying transmission media, such that equipment installed at a particular time will not soon be obsolete, but can continue to be used for communication as overall communication speeds are increased in the future.

These needs are largely expected to be met through broad implementation of so-called asynchronous transfer mode (ATM) communication networks. As distinguished from synchronous transfer mode (STM) communications, ATM allows the traffic rate from a particular source to be increased or decreased upon demand when communication is desirable. By comparison, in STM, a particular user is assigned particular synchronous transmission time slots on a particular communications medium, limiting the flexibility of the system. The significance of this distinction between asynchronous and synchronous transmission to the invention is discussed further below.

ATM networks are in the process of being installed in conformity with internationally-agreed upon standards for transmission of "cells" of data, including in "data" as used herein digitized voice communication, digitized images, and digitized video, as well as data per se. In ATM, all types of messages to be transmitted are divided into fixed length "cells", each cell including a header including cell payload type and routing information, and a fixed length "payload". The payload of each cell typically contains a relatively small portion of an overall message to be transmitted from a source to a destination. The ATM cells are transmitted by way of a source node into a network comprising a large number of switching nodes connected by communication links. Accordingly, an overall message to be transmitted from an originating source to an ultimate destination is divided into a number of cells, transmitted in sequence over a "virtual connection" established when the communication is established. Each cell transmitted as part of an ATM message transits the same virtual connection, that is, is routed through the same sequence of switching nodes and connecting links.

It is important in effective implementation of ATM networks that the specific type of communication links included in each virtual connection not be a constraint on the format of the ATM cell. That is, the cells of a particular ATM message may be transmitted by wire, by fiber optic cable, by satellite, or by combinations of these. The cell format itself remains unchanged. In this way, flexibility of the network configuration and implementation of future faster communications media can be provided without, for example, rendering obsolete the equipment used to generate cells from messages to be transmitted.

By comparison, according to another modern day communication technology, data is commonly transmitted in the so-called "frame relay" mode, wherein each "packet" transmitted includes the entire message. Hence each packet is of different length. In frame relay transmissions, the packet of data corresponding to the message is preceded by a single header, such that the entire message is transmitted in one long burst over a predetermined route through a series of nodes from a source node to a destination node. This system remains workable, but is relatively inflexible as traffic needs change from time to time. Further, frame relay transmission is best suited for communication of data per se, which tends to be "bursty". Voice and video communication have different intrinsic requirements.

More specifically, communication of data per se is typically time-insensitive, in that some time delay, and considerable variation in the time delay experienced by successive messages or segments of messages, between the time of transmission and the time of reception does not interfere with utility of communication. Voice and video transmissions are by comparison very sensitive to transmission time, in that all portions of the message must be received at a rate closely proportional to the rate at which they are transmitted, if important information is not to be lost. Variation in the delay between segments of a voice or video transmission is particularly disturbing to the receiving party.

In ATM, as noted, messages are divided into relatively small cells which are individually transmitted. For example, a voice communication may be transmitted in cells each effectively encoding single words, or even single syllables. The ATM format allows the individual cells of the message to be transmitted relatively instantaneously, such that they can be reassembled and delivered to a listener or viewer at the destination without perceptible delay. More specifically, because each message is transmitted over its own virtual connection, set up only after determination that the nodes involved have sufficient bandwidth to accommodate the anticipated cell rate, overloads can be avoided and the cell delay minimized.

It therefore will be appreciated that, in essence, an ATM communication involves setting up a virtual connection identifying a sequence of nodes extending between a source and a destination, and dividing the message into cells of equal length. The cells of the message are subsequently transmitted over the virtual connection, which may include each or all of wire conductors, optical links, or satellite relay links. At the ultimate destination, the headers of the cells are removed, the payloads are reassembled, returned to analog format when appropriate (e.g., in voice communication), and delivered to the user.

The basic format of the fixed-length ATM cell (a "cell" corresponding generally to a "packet", as that term is usually used), includes a header consisting of five eight-bit bytes (or "octets"), these including cell payload type and routing information, followed by 48 bytes of payload. Various standards organizations have agreed on the format of the header and the overall cell structure. See, for example, "ATM Pocket Guide", a publication of Tekelec of Calabasas, California. As shown therein, and as reproduced by FIG. 4 hereof, the ATM header of each cell includes at least 24 total bits of routing information, comprising 8 bits of "virtual path identifier" (VPI) information and 16 bits of "virtual channel identifier" (VCI) information.

In transmission of ATM cells, the VPI and VCI routing information in each cell header is updated at each node, responsive to predetermined information stored by each node at call origination. The VPI and VCI information stored in each cell at any given time is used by each node to route the cell to the next node in the series of nodes making up the virtual connection, as established at call origination.

More specifically, unlike a frame relay transmission, wherein the header information is unchanged as the packet transits the entire route from its originating source to its ultimate destination, in ATM, the VPI and VCI routing information in the header of each cell is updated as each intermediate node is transited.

As noted, each cell of any given ATM message transits the same virtual connection, that is, the same sequence of nodes. As part of the call origination process, information is stored at each node in the virtual connection, providing VPI and VCI information used to identify each incoming cell and update its VPI and VCI, so that the cell is properly switched to its next destination node in the virtual connection. Thus, as each cell is received at a node, its individual VPI and VCI information is examined by the node, and stored VPI and VCI information needed to convey that cell to the next node is used to update the header accordingly. It will therefore be appreciated that each node in an ATM network includes means for examining the header of each cell received and updating the VPI and VCI information accordingly.

The call origination process in ATM is well defined and need not be detailed here except to mention that when a call is originated, a series of "signaling" messages are passed back and forth between the originating source node, the intermediate nodes, and the ultimate destination node. The call origination process involves the sending of a message of predetermined format, indicating the relevant cell parameters, e.g., the total number of cells to be transmitted, and their anticipated rate of supply. Each node which receives this call set-up message considers the requirements of the call, e.g., the anticipated cell density, and the like, to determine whether it has bandwidth —that is, communications capability - sufficient to handle the anticipated number of cells. During this process each of the intermediate nodes ultimately forming part of the virtual connection to be thus established must in effect agree to the traffic requirements anticipated, and must store sufficient information to allow updating of the VPI and VCI as the cells of that message transit that particular node.

ATM Service Classes

Because ATM supports communications of various types, e.g. data, voice, and video, ATM service classes have been developed to meet the differing needs of each connection type. Constant bit rate (CBR) service is designed to support ATM communications requiring transmissions with consistent, comparatively low cell rates, e.g. voice and video communications. In contrast, variable bit rate (VBR) service, e.g., for time-insensitive data communications, is designed to support ATM communications requiring short bursts of high peak cell rate bandwidth, typically with a much lower overall sustained cell rate.

Recently, an ATM available bit rate (ABR) service has also been designed to support time-insensitive data communications. Unlike the VBR service, the ABR service uses feedback from the network during operation to continuously change the cell rate based on the available bandwidth. By using operational feedback from the network, the ABR service promises to increase the efficient use of the network. The ABR feedback mechanism is implemented using resource management (RM) cells which are easily identified by ATM switching nodes by a unique payload type indicator value provided in the header of each RM cell.

More specifically, RM cells are generated at regular intervals and interspersed with user cells by an ABR source. The destinations of the ABR connections loop the RM cells back, that is, detect the RM cells, turn received RM cells around, and transmit them back to the source. Intermediate ATM switching nodes through which the RM cells pass may alter the contents of fields within the RM cell payload to indicate congestion or make explicit cell rate adjustments. Upon receipt of a returned RM cell, the ABR source uses the enhanced proportional rate control algorithm (EPRCA) to update its allowed cell rate.

As with any control system using feedback, the response time of the feedback loop must be known in order to assure its proper operation. Hence, it is important to network performance to accurately estimate the round trip time experienced by the RM cell, that is, the time required for the RM cell to travel from its source to its destination and be looped back to the source, as this affects the response time of the ABR connection to changes in the network's available bandwidth.

U.S. Pat. No. 5,343,463 to Van Tetering et al discusses a method for measuring the performance characteristics of a path of an ATM telecommunications switching network by transmitting test cells from a test instrument associated with an originating source in place of user cells while other live traffic is operating, and detecting these test cells using a second test instrument at a destination. U.S. Pat. No. 5,271,000 to Engbersen et al identifies a method and apparatus for testing and evaluating distributed networks by transmitting generic test cells through the ATM network to a test cell analyzer where the transmitters are located at a geographically distributed locations with respect to the analyzer. Engbersen et al also contemplates association of the test equipment with source and destination nodes.

It would be preferable to be able to connect a test instrument for measuring relevant network operational characteristics between nodes anywhere in the network, without impacting user traffic. More specifically, it would be desirable to provide an instrument and method for measurement of the round trip time parameter of selected active virtual connections.

Objects of the Invention

It is therefore an object of the invention to provide an instrument and method for accurately measuring cell round trip time (RTT) between specified points in an ATM network, including intermediate nodes in the network.

More specifically, certain nodes in a network may be configured as "virtual source/virtual destination (VS/VD)-capable" nodes, as to which the RTT may be highly relevant in order to optimize the use of network resources, including bandwidth and buffer space. Such VS/VD-capable nodes are in distinction from originating source, ultimate destination, and ordinary intermediate switching nodes. VS/VD-capable nodes are usually configured as intermediate nodes within the wide area network, and no user terminals, computers, or the like are connected thereto. However, it is desirable to measure round trip travel time between VS/VD-capable nodes themselves, and between these and source and destination nodes, to optimize network performance; to provide this facility is accordingly an object of the invention. More specifically, it is an object of the invention to provide RTT measurement to support the steady-state operation of the Enhanced Proportional Rate Control Algorithm (EPRCA) as it is applied to fairly distribute the available network bandwidth to available bit rate service connections.

Accordingly, it is a further object of the invention to provide a test instrument and method for measuring the round trip travel time between such intermediate VS/VD-capable nodes within a network, between the originating source and the first encountered VS/VD capable node, and between the last VS/VD capable node and the ultimate destination node.

SUMMARY OF THE INVENTION

The above objects of the invention and others which will appear as the discussion below proceeds are provided by the present invention, according to which a test instrument containing the present invention is provided for connection to a node of a network. Such a node may be an originating source or ultimate destination node, typically termed a gateway node, or may be an intermediate node.

A test instrument containing the invention is operated to inject test cells containing predetermined information, such as a time stamp indicating the time of transmission of the cell, into the network. A second similar test instrument is provided at a different second node in the system. Test cells are detected by the second instrument and "looped back" to the originating node for detection by the first test instrument. Time-of-departure time stamps are inserted into the payloads of the test cells by the first test instrument, and time-of-arrival time stamps are appended to the looped-back test cells, enabling accurate measurement of their round trip travel time.

Where the round trip time between nodes is to be measured on out-of-service virtual connections, that is, while particular virtual connections are fully configured and active, but are not being employed immediately to transport user traffic, test cells configured as user cells and containing time-of-departure time stamps are transmitted from a first test instrument at a first test access point into the virtual connection. As noted, these test cells are identified by a second test instrument at a second test access point, intercepted, and looped back toward the first test access point. The looped-back test cells are identified at the first test access point, removed from the connection, and appended with an time-of-arrival time stamp. The round trip time is determined as the difference between the two time stamps.

Where the round trip time between nodes is to be measured on in-service virtual connections, that is, while the virtual connections are actively transporting user traffic, test cells configured as operations, administration, and maintenance (OAM) cells containing time-of-departure time stamps may be similarly transmitted from a first test instrument at a first test access point into the virtual connection. OAM cells are selected for this purpose as OAM cells are normally used to transmit network overhead messages, and do not interfere with transmission of user traffic. These OAM cells are then identified by a second test instrument at a second test access point, intercepted, and looped back toward the first test access point. The looped-back OAM cells are identified at the first test access point, removed from the connection, and appended with a time-of-arrival time stamp. The round trip time is again determined to be the difference between the two time stamps.

OAM cells include performance management (PM), fault management (FM), and other types of cells. OAM-PM cells are treated by nodes in the same manner as are user cells; OAM-FM cells may be processed differently by the nodes than are user cells, and may not experience the same cell delays to which the user cells are subject. Test cells configured as OAM-PM cells are therefore preferred for RTT measurement according to the invention. However, where PM cells are not available, use of the OAM-FM-configured test cells avoids interference with transmission of user traffic.

BRIEF DESCRIPTION OF THE DRAWINGS

The invention will be better understood if reference is made to the accompanying drawings, in which:

FIG. 1 shows a schematic overview of a network for ATM traffic communication;

FIG. 2 shows a schematic diagram of the mechanism whereby a node updates the VPI and VCI information of each ATM cell it processes;

FIG. 3, including FIGS. 3(a)–3(c), shows three possible methods of connecting a test instrument to the test access port of a network node;

DESCRIPTION OF THE PREFERRED EMBODIMENTS

Figure 4:
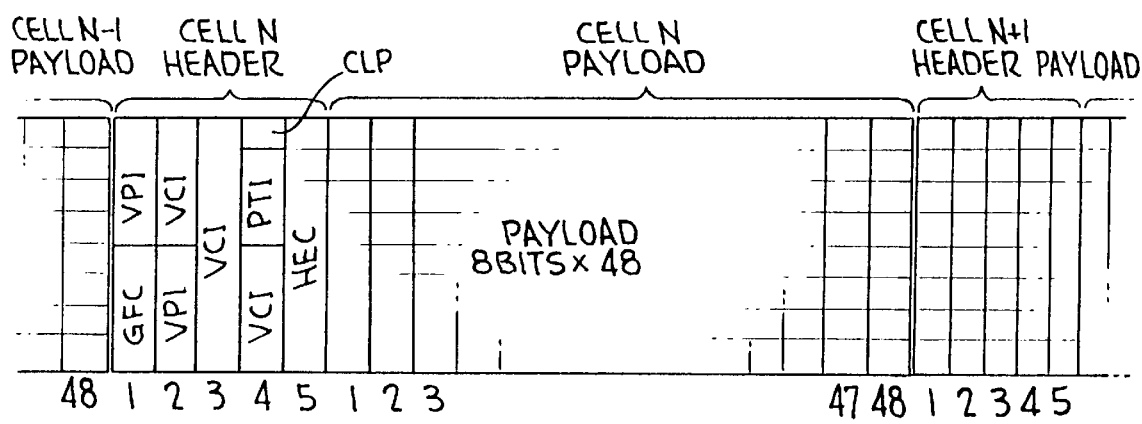
FIG. 4 shows schematically the layout of a typical ATM cell according to the standardized ATM format used in the industry.

As discussed above, the present invention relates to an instrument and methods for measuring the round trip travel time of cells between specified nodes within an ATM communication network.

The following provides certain additional information helpful in understanding the precise nature of the technical problems to be addressed by the invention, prior to discussion of the manner in which the invention resolves these problems.

As indicated above, asynchronous transfer mode (ATM) transmission of data (including in "data" voice, images, and video, digitized as necessary, as well as data per se) involves the segmenting of all messages to be transmitted into equal-length "cells" that are time-multiplexed over a communication link (i.e., cells from plural sources are transmitted in "time slots" as available) at a source. Each cell of a given message is transmitted over the same sequence of nodes and links, termed a "virtual connection", to the destination of the particular message. The virtual connection is established at a call setup time wherein the originating source node sends out a first message including information as to the bandwidth required for transmission of the message. Candidate intermediate nodes then determine whether they can satisfy the bandwidth requirements of the traffic, and may negotiate these parameters if necessary. Ultimately, a virtual connection is established by storing next-node destination information in content-addressable memories (CAMs) or other circuitry comprised by each of the nodes; that is, VPI and VCI information pertaining to each segment of the virtual connection of which a given node is a component is stored at call origination, such that the routing information of each cell is updated as it passes through each of the nodes included in the virtual connection.

As the individual cells of a particular message transit the network, they may be multiplexed several times, e.g., from a relatively low speed local area network into a much higher speed wide area network. The links connecting the nodes may include conductive wires, optical fibers, and/or satellite transmission links. The streams of cells received at the ultimate destination nodes are demultiplexed and presented to the users connected to the ultimate destination node. Because each of the cells of a particular message transits the same sequence of nodes making up the virtual connection, each of the cells should arrive in its proper order. However, commonly the ultimate destination node will assemble the various cells of the message in a buffer, and strip off the header information and other non-message components of the cells, such that the entire message can be accessed in a single operation.

Virtual Source / Virtual Destination Capable Switching Nodes

A further aspect of ATM network design important to understanding the various capabilities necessary in a test instrument according to the invention relates to the provision of virtual source/virtual destination (VS/VD) capable nodes. As indicated above, many nodes are "gateway nodes", that is, are adapted, for example, to interface a number of computers connected by way of a local area network to the "wide area" ATM network itself. A gateway node, for example, will typically have the capability of formatting a much longer message received from a terminal on a local area network into a number of ATM cells for transmission over the network via a number of intermediate nodes connected by links to a destination node. The destination node will similarly have the capability of collecting all the cells of a particular message, stripping off the header information, storing the payloads of the cells in a buffer, and then transmitting the entire message to its ultimate destination, which might typically be a computer connected to a second local area network. Intermediate nodes, by comparison, exchange continuous streams of cells with all the other nodes to which they are connected, in order to maintain synchronization, transmitting unassigned or idle cells when no user traffic is available for transmission. Intermediate nodes do not serve as a source or destination of user cells. It is normally not possible for a user to add a specific cell into the streams of cells processed by such "normal" intermediate nodes.

According to recent developments, however, certain intermediate nodes in the network, these being defined herein as nodes to which there are not connected sources or destinations of traffic per se, are configured as virtual source/virtual destination (VS/VD) capable nodes. VS/VD-capable nodes implement the Enhanced Proportional Rate Control Algorithm (EPRCA) (a cell flow control algorithm) which fairly allocates and deallocates the available bandwidth across all active available bit rate (ABR) virtual connections. Such VS/VD-capable nodes are provided at minimum with the capability to recognize, via inspection of the "payload type identifier" within the cell header, an incoming "resource management" (RM) cell belonging to an existing ABR virtual connection and loop it back to its source. Such RM cells are used in ordinary network traffic management as a feedback mechanism. This capability allows measurement of the characteristics of network connections (1) between the source and a VS/VD-capable node, (2) between VS/VD-capable nodes, and (3) between a VS/VD-capable node and the destination to be monitored separately, that is, apart from monitoring the performance of the network as a whole. These features are used, for example, in locating congested areas of the network.

More specifically, the overall ATM network may include thousands of nodes connected by an even larger number of links. It is important that the specific structure of the network be flexible and essentially undefined, so as to not require a vast amount of reprogramming every time a node is added or replaced. However, it is necessary to be able to determine whether congestion is frequently present in a particular node or region of nodes, so that, for example, another node or a node of increased capability can be provided to reduce the congestion. The RM cells are used by the network in effect to send control messages responsive to detection of congestion. Accurate determination of RTT, as provided according to the invention, is needed to calculate the number of cells "in flight" at any given time, needed to accurately evaluate congestion.

Still more specifically, in order to dynamically manage the allocation of the available bandwidth within a network segment and identify points of congestion within the network, it is important to be able to transmit cells between intermediate nodes in the network, effectively segmenting the network. VS/VD-capable nodes have been developed to provide this capability. According to an important aspect of the invention, a test instrument is provided with the capability of measuring the round trip travel time (RTT) of cells transmitted between the VS/VD-capable nodes. Test cells, which may be configured as user cells or OAM cells, are provided with VPI and VCI information sending them to a second VS/VD-capable node, are provided with time-of-departure time stamps, and injected into a stream of cells at a test access point of a first VS/VD-capable node. A second test instrument at a test access point for the second VS/VD-capable node detects the test cells, and loops them back to the first test instrument. The first test instrument detects the test cells and appends time-of-arrival time stamps. The pairs of timestamps are compared to provide an accurate measurement of the round trip travel time of the cells over that segment of the network.

Topology of an ATM Network

FIG. 1 shows in schematic form the overall arrangement of an ATM network, exemplified by the connection of a local area network 10, that is, a number of individual computers 12 interconnected by well-known local area network hardware, to a wide area ATM network indicated generally at 22. For example, a local area network 10 may exist on a college campus or the like, as indicated. The local area network (LAN) comprises a number of individual computers 12 each connected by LAN interface units 14 to ATM LAN switches 16. The ATM LAN switches 16 provide communication between computers 12 of the LAN 10, and also identify cells intended for destinations outside the LAN 10 and convert these to ATM cells, a process which will be detailed further below. LAN 10 is connected by an ATM user network interface 18 to wide area network 22 by way of an ATM switch 20. Network ATM switch 20 is thus a "gateway" node to the wide area ATM network 22. Network 22 comprises a large number of intermediate nodes 23 connected by a large number of links 24. ATM traffic may also be originated by digital telephone equipment, video conference equipment, or other known devices.

As indicated above, various nodes 23 transmit at differing transmission rates and are connected by correspondingly-varied media, i.e., links 24. Low speed nodes may be connected by wire conductors; more commonly, and especially in new installations, optical fibers are being used to connect high speed nodes so as to enable very high speed data transmissions from point to point. Satellite links may also connect various nodes.

As noted above, as a rule, an overall message to be transmitted over the ATM network, which may be a few seconds of digitized voice or video, or data per se, is divided into a large number of cells of identical format. The individual cells are generated by an ATM switch serving as a gateway node 20. Each cell is provided with initial VPI and VCI information at the gateway node, which is used to direct it to the first intermediate node in its virtual connection. As the cells transit the wide area network 22, their VPI and VCI information is updated at each node 23 until the cells reach a similar network ATM switch serving as a destination node 28 connected to the ultimate destination of a particular message. The ultimate destination may be a computer 25, similarly part of a local area network by virtue of being connected to a LAN router 26, in turn connected to destination node 28. As indicated, the structure and operation of the ATM network is well known and is defined by a variety of different standards describing the interfaces between the various classes of nodes, links, LANs, and other components involved.

FIG. 2 shows schematically the updating of each cell at each node in a normal ATM connection. Cells arriving on an incoming line 30 reach the node 32. More specifically, streams of incoming cells are received over a plurality of links 24, and are multiplexed by a switch 29 to provide a single stream of cells via line 30, to each node 32. Each incoming stream of cells will typically include cells from a number of virtual connections. As discussed above, and in further detail below, each ATM cell includes a 5-byte header, including VPI and VCI routing information identifying the next node in the virtual connection established for the cells of each message.

The VPI and VCI of the incoming cells, shown schematically at 34, are supplied to the comparand register 35 of (typically) a content-addressable memory (CAM) 36. When correspondence between the VPI and VCI of the incoming cell and the contents of the CAM 36 is detected, the CAM outputs updated VPI and VCI routing information from data stored at 38 at call set-up with respect to each virtual connection. The new VPI and VCI then become part of the header of the outgoing cell, and are used to similarly identify the cell at the next node. A multiplexing switch 39 forming the connection of each node to a plurality of outgoing links 24 is controlled such that each cell is transmitted over the correct link to reach the next node in the virtual connection.

Thus, as discussed above, at each node in a virtual connection, the VPI and VCI of the incoming message are updated to indicate the next node in the network to which that particular cell is to be transmitted. The correspondence between the "incoming" and "outgoing" VPI and VCI information is established at call origination and stored in each node forming part of a virtual connection established for each message by exchange of a sequence of call set-up messages between an ultimate source node and an ultimate destination node. While the capability of updating the VPI and VCI routing information of each cell at each node can be provided using other circuit components, currently-preferred node designs typically use CAMs in each node to provide the VPI and VCI updating at very high speed. Nodes having this capability are within the skill of the art as of the time of filing of this application. See U.S. Pat. Nos. 5,414,701 to Shtayer and 5,422,838 to Lin.

In the embodiment shown, the nodes themselves each comprise routing intelligence, that is, for responding to call set-up messages to establish virtual connections. However, the invention would also be useful in evaluating a network designed such that one or more central routers determined the sequence of nodes and links to be traversed-by the cells of each message, i.e., to define the virtual connections.

Methods Of Test Access

FIGS. 3(a)–3(c) show three different methods whereby a test instrument according to the invention can be connected to a conventional preexisting node 42 of an ATM network, using, in this example, electrical wire connections. As shown, node 42 is connected to two incoming lines 44 and 46 and two corresponding outgoing lines 48 and 50, respectively. As shown in FIG. 3(a), the test instrument 54 may be connected to two test port terminals 52 in a "monitor" mode of operation of the test instrument of the invention. In this mode, network service is undisturbed; the test instrument simply monitors traffic through the node and may perform various tests, maintain network operation statistics, and the like, without affecting flow of traffic.

In an "emulate and terminate" mode shown in FIG. 3(b), the test instrument effectively terminates incoming line 46 and originates traffic over transmit line 48. In this mode of operation, the test instrument effectively takes the node out of service.

Finally, in a third "through" mode, shown in FIG. 3(c), the test instrument is interposed in the traffic path between the incoming lines 44 and 46 and the corresponding outgoing lines 48 and 50.

In the "through" mode, all traffic passing through node 42 is delayed by a fixed period of time, typically an integral number of cell time slots, varying with the rate of transmission of the cells at that particular point in the network, to enable test instrument 54 to carry out the appropriate processing steps. It will be apparent that it is desirable that all traffic be delayed identically so that the order of cell transmission is not disturbed, which would interfere with reassembly of the cell payloads into coherent messages. Further, it is important that the delay be as short as possible.

The present invention can be implemented using a test instrument connected in either of the "through" or "emulate and terminate" modes of operation.

Note that networks linked by high speed fiber optic lines may be accessed in a conceptually similar way, although there are no currently standardized methods for providing test access to nodes in fiber optic networks.

In each of FIGS. 3(a)–3(c), the ports at which the test instrument 54 receives traffic from the node are labeled RX1 and RX2, while the ports through which the test instrument transmits data back to the node for transmission over the network are referred to as TX1 and TX2.

Format of an ATM Cell

FIG. 4 shows the format of the typical ATM user cell. As discussed above, each ATM cell includes 53 8-bit bytes, that is, includes a 5-byte header and 48 bytes of payload. The payload may contain user data, in the case of normal user cells, or control information, in the case of operations, administration, and maintenance (OAM) or resource management (RM) cells. The individual cells in a stream of cells may be separated by additional cell delineation bytes of predetermined format, depending on the precise medium of transmission being employed.

Within a LAN, and at the ATM User Network Interface (UNI) 18 (FIG. 1), the first byte of the header includes four bits of generic flow control (GFC) information, followed by four bits of virtual path identifier (VPI) information. Within the wide area network, the GFC bits are typically replaced with four additional VPI bits. VPI information also makes up the first four bits of the second byte, which is followed by four bits of virtual channel identifier (VCI) information. All eight bits of the third byte of the header include VCI, as do the first four bits of the fourth byte. The 24 (or 28) total bits of VPI and VCI together comprise routing information for the cell. Where the cell is an unassigned or idle cell, the VPI and VCI bits are all set to zero; the test instrument of the invention is capable of recognizing this and inserting an OAM-configured test cell in place of an unassigned or idle cell. The fifth, sixth, and seventh bits of the fourth byte of the cell header are payload type identifier (PTI) bits, which typically indicate whether the payload of the cell includes user data, whether the segments of the network through which the cell has traveled have experienced congestion and the like, or whether the cell is a "OAM" cell, used for control of network operation, administration, and maintenance, a resource management (RM) cell, used, for example, to control available bit rate (ABR) connections, or the like. The last bit of the fourth byte is a cell loss priority (CLP) bit, a "1" indicating that the cell is subject to discard in the event of network congestion or the like. Where the VPI and VCI fields are all zeroes, the CLP bit differentiates between idle and unassigned cells. Finally, the fifth byte of the header includes header error control (HEC) data used to reconstruct the header if a single bit error is detected within the cell header by any of the nodes along a virtual connection.

Again, as discussed above, the VPI and VCI information included in the header of each ATM cell is updated at each node as the cell transits its virtual connection from its originating source node to its ultimate destination node. More specifically, each node stores VPI and VCI information corresponding to each virtual connection then being supported. When the sequence of nodes making up the virtual connection is determined at call origination, the VPI and VCI information of the incoming cells is stored by each node in association with the corresponding VPI and VCI information to be written into the header of each cell, so as to update the network routing information of each cell as each node is transited.

Contrasting Switched and Permanent Virtual Connections

The VPI and VCI information is normally arbitrary, in that it cannot be analyzed to identify the ultimate source of the cells, to identify the position of a cell in a sequence of cells, or the like. The VPI and VCI information also does not include a virtual connection identifier per se. However, it will be appreciated by those of skill in the art that certain VPI and VCI values are "reserved", e.g., for call origination messages. Candidate nodes identify the reserved VPI and VCI of call origination messages in order to respond to the call set-up query, i.e., to determine whether they can serve as part of a proposed virtual connection. Certain "permanent" virtual connections (as opposed to "switched" virtual connections established at call origination, as described) may also be established by permanent VPI and VCI assignments. Further, individual service providers may employ parts of the VPI field to indicate levels of service and the like.

Test Instrument Functional Description

Figure 5:
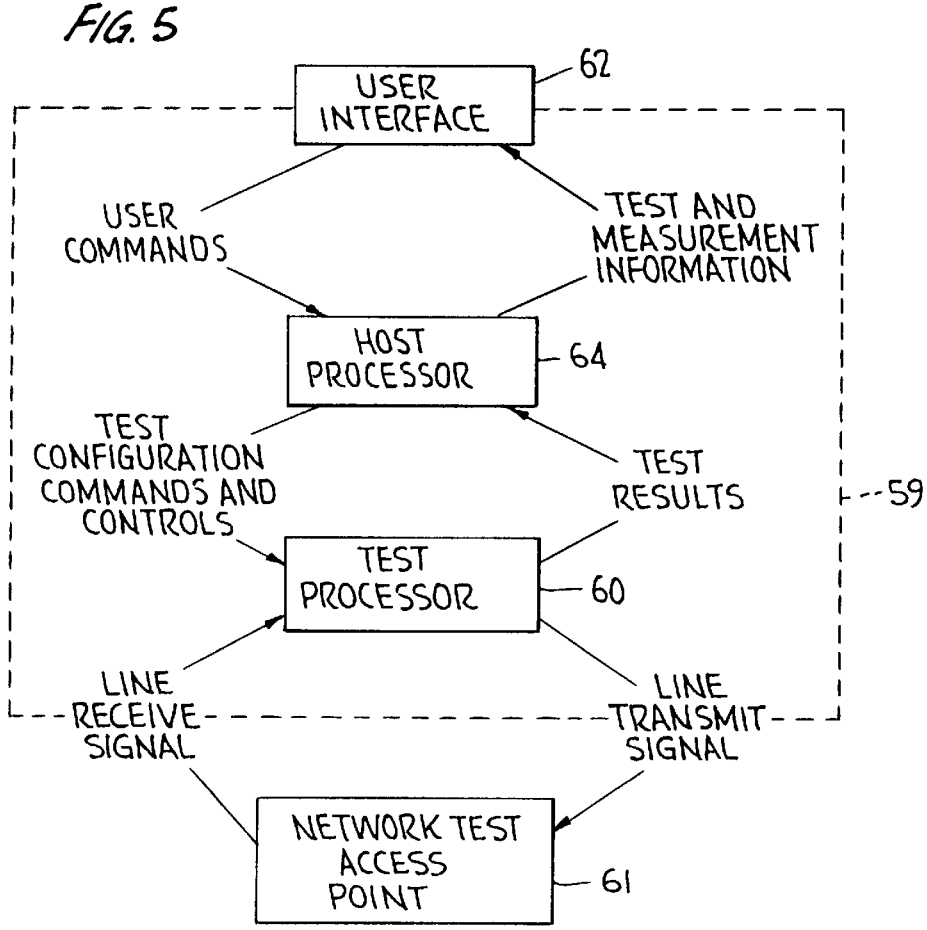
FIG. 5 shows a diagram illustrating the top level architecture of a test instrument.

FIG. 5 shows a block diagram of the principal components of a test instrument 59 for carrying out the functions provided according to the invention. The processing steps required to carry out the various tests made possible according to the invention are performed in main part by a test processor 60 implemented as a real-time embedded processing system, shown in more detail in FIG. 6.

The specific operations to be carried out by the test processor 60 are controlled by a user providing commands by way of a user interface 62 which is in turn connected to test processor 60 by a host processor 64. The host processor 64 may comprise a personal computer providing the user with the ability to specify the type of test to be performed, include specific messages, and provides substantial processing capability with respect to test results and the like received by way of test processor 60. The test processor 60 is connected to an associated node, as shown in FIGS. 3(a)–(c), via a network test access point 61. Test instruments including a user interface, a test processor, and a host processor are generally known; the invention in this case generally resides in the specific functions provided by and structure of the test processor 60.

As discussed, the test processor 60 identifies specific cells in a stream of cells by comparison of the VPI and VCI fields of each cell to information stored in the test processor. The stored information is provided by the user, who (for example) would key the information into the host processor 64 by way of a keyboard comprised by the user interface 62. The user in turn may obtain the VPI and VCI information from a system administrator, who assigns this information to each new virtual connection. The instrument may also store VPIs and VCIs received for a period of time, building a list of active connections. The user may then select one for analysis. A virtual connection may also be established specifically in order to test specific aspects of network operation, and the VPI and VCI then communicated to the user at the test instrument.

Test Processor Block Diagram

Figure 6:
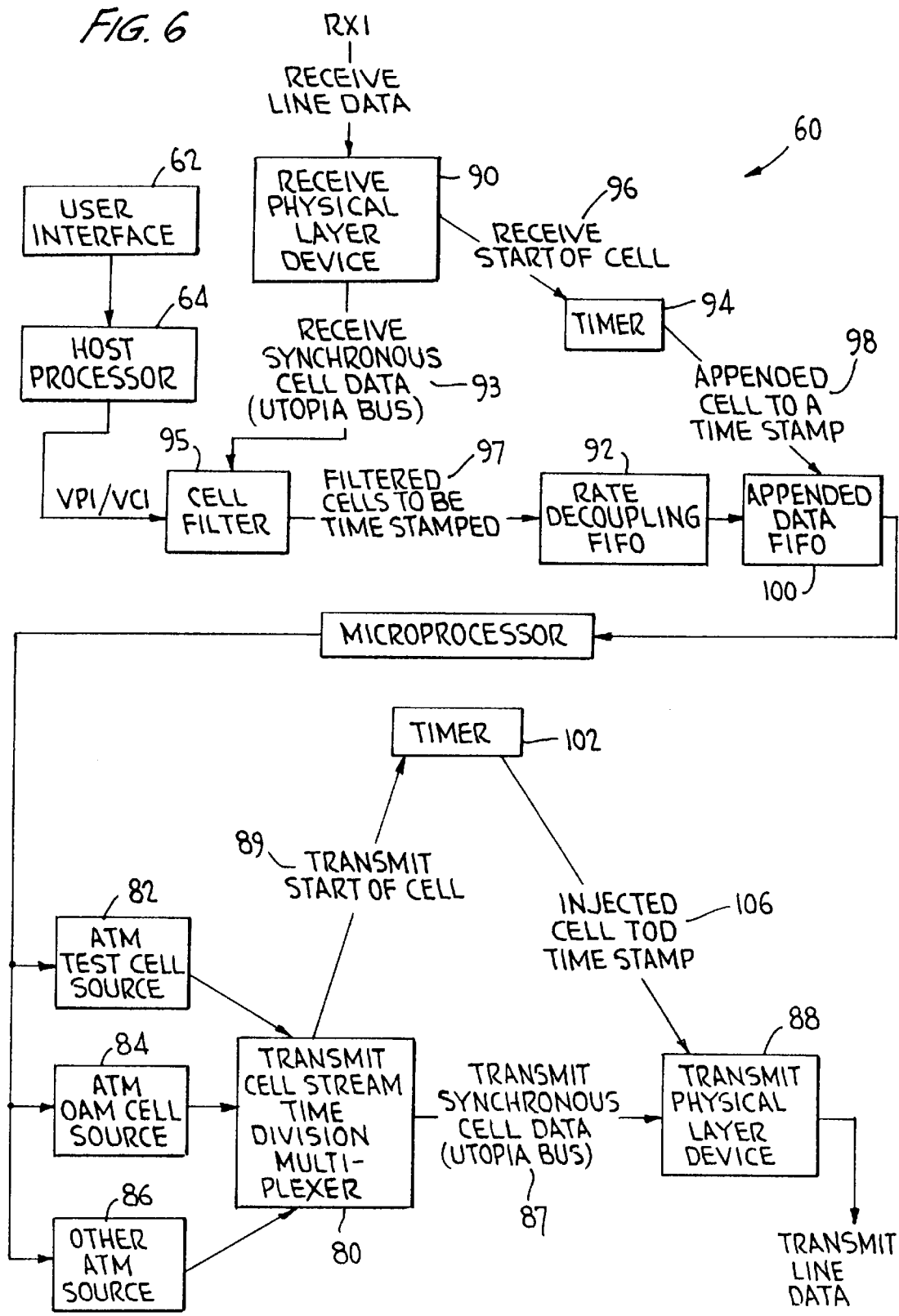
FIG. 6 illustrates a block diagram of a test instrument according to the invention and illustrates the manner in which time stamping is performed in order to minimize the error in making round trip time measurements.

FIG. 6 shows the principal components of the test processor 60. Incoming cells are received by a receiver 90. The VPI and VCI fields of each cell are compared by a cell filter 95 to VPI and VCI information pertaining to a virtual connection of interest, as supplied by the user via the user interface 62 connected to test processor 60 by a host processor 64, as shown in FIG. 5.

As discussed in further detail below, according to the present invention test cells with VPI and VCI information identifying them as belonging to a particular virtual connection, and including time stamps in their payload portions, are transmitted by a first test instrument. A second test instrument at a second location detects the test cells and loops them back to the first instrument. The first instrument detects the test cells, appends received time stamps thereto, and compares the pairs of time stamps to measure the RTT of each test cell.

It will be apparent that the ability of the test instrument to recognize a single cell from a stream of essentially identical cells is critical to the RTT measurement capability.

Relation to Copending Applications

To clarify the relation of this application to the copending applications incorporated by reference above, according to the invention of copending Ser. No. 08/560,117, cells identified as belonging to a particular virtual connection may be replaced in the stream of cells by test cells, which may be modified user cells, and which may be configured as operations, administration, and maintenance (OAM) cells.

Control of the particular operation to be performed by the instrument of the invention is controlled responsive to user commands provided to host processor 64 (FIG. 5). For example, where it is desired to measure the size and rate of bursts of cells from a particular virtual connection, e.g., to monitor the compliance of traffic to contractual provisions, a field-programmable gate array circuit may be responsive to the cell filter for calculating these parameters responsive to a "leaky bucket" algorithm. See co-pending Ser. No. 08/560,286.

The test instrument of the invention may also be employed for measuring various statistics of interest in monitoring network operation. See co-pending Ser. No. 08/563,552 for further details.

Returning to discussion of FIG. 6, cell filter 95 can be implemented in at least two ways. In both cases, the basic function of the cell filter is to compare stored VPI and VCI information, for example, representative of cells belonging to a particular virtual connection, to the VPI and VCI of each incoming cell. Where cells belonging to a particular virtual connection need simply be identified, the cell filter is preferably implemented as combinatorial logic, in particular, by a set of exclusive-OR gates, as shown in further detail in copending Ser. No. 08/560,117. Where one or more characteristics of the cells are to be monitored, or where cells from a number of virtual connections are to be identified, a content-addressable memory (CAM) is the preferred implementation of the cell filter. See copending Ser. No. 08/563,552.

The OSI Seven Layer Model

The receiver 90 and transmitter 88 in FIG. 6 both perform functions usually termed part of the "physical layer" of a communication device. The "physical layer" nomenclature refers to the first layer of a seven-layer industry standard model of communications referred to as the "Open Systems Interconnection" (OSI) model. Copending Ser. No. 08/560,117 provides further details of the OSI model.

For example, when a cell is received by the test instrument, the physical layer receiver 90 of the node organizes the serial stream of bits transmitted by the physical medium as an 8 bit wide by 53 byte long cell as shown in FIG. 4; when a cell is to be transmitted, transmitter 88 performs the inverse function.

Overview of OAM Performance Management Processing

As discussed above, certain cells provided in the network are termed OAM (operations, administration, and maintenance) cells. Bits in the PTI field of the header (see FIG. 4) are set identifying OAM cells for identification by the nodes. These OAM cells accordingly do not contain user data, but include payload information provided for other purposes. The instrument of the invention may be employed to transmit OAM cells, e.g., between intermediate nodes, to measure cell loss ratios at regular intervals between two nodes. For example, a given node may transmit an OAM cell every, say, 256 cells, and the receiving node may count the cells received between detection of OAM cells. If the result is not 256, it is apparent that a cell has been lost or misinserted.

According to the invention, a time-of-departure time stamp may be added to the payload portion of such an OAM cell by a first test instrument when it is transmitted. The OAM cell is looped back to the source at a second location within the network along the path of the virtual connection (e.g. at the destination or at a VS/VD capable switch). A second time-of-arrival time stamp is appended to the OAM cell upon its arrival back at the source. The difference between the two time stamps provides an estimate for the round trip time of a cell which would travel the same path of the looped OAM cell on the virtual connection. The same process may be performed with respect to a test cell configured as a normal user cell.

Measuring Round Trip Time (RTT)

The computation of the RTT of an ATM cell is a simple subtraction of two time stamps. The Cell TOD (time-of-departure) time stamp written into the payload of a test cell indicates when the cell is introduced into the ATM network. The Cell TOA (time-of-arrival) time stamp similarly indicates when the cell is extracted from the ATM network. The round trip time (RTT) is computed as follows: RTT=Cell TOA−Cell TOD.

FIG. 6 shows a flow diagram and illustrates schematically the principal hardware components of the test processor as required for performing round trip travel time computations according to the invention, and shows the flow of signals therebetween. More specifically, the test processor detailed in FIG. 6 injects one or more cells into the network, each including a time-of-departure (TOD) time stamp. In the embodiment shown, test cells are "looped-back" by a similar instrument at a distant node, and detected by the transmitting test instrument, which then appends a time-of-arrival (TOA) time stamp to the test cells. As above, the RTT is then computed simply as TOA−TOD. As noted, the loop-back function is provided by a similar test instrument at a distant node to detect the test cells having time stamps therein, and to loop them back to the first node to which the test instrument shown in FIG. 6 is connected.

The upper portion of FIG. 6 illustrates components for receiving time-stamped test cells from the network, while the lower portion of FIG. 6 shows the components required to inject a time stamp into a test cell for transmission over the network. Turning first to the "receive" components depicted on the upper portion of FIG. 6, the receive physical layer device 90 extracts the cells from the network, connected at port RX1; this function is commonly referred to as cell delineation. Receiver 90 forwards all extracted cells to cell filter 95, preferably via the industry-standard UTOPIA bus 93. Cells exiting the cell filter 95 are stored briefly in a rate-decoupling first-in, first-out (FIFO) buffer memory 92. The rate-decoupling FIFO 92 is used to store the cells for a time sufficient to allow cell filter 95 to determine whether each cell is a test cell by examination of its VPI and VCI fields, and if so, to cause a timer 94 to append a cell time-of-arrival (TOA) time stamp 98 to the identified cells 97.

The UTOPIA bus specification was developed by the ATM Forum to define a standard implementation for transferring ATM cells between the physical layer and the ATM layer of the OSI model, as described above. A receiver conforming to the UTOPIA bus specification provides a "Receive Start of Cell" signal 96 at a specific point during reception of each cell, which is used according to the invention to trigger timer 94 to provide the cell TOA time stamp. That is, the receiver provides a synchronous "Receive Start of Cell" signal 96 when a cell is received; where filter 95 indicates the received cell is a test cell, timer 94 generates a TOA time stamp 98. The TOA time stamp is appended to the cell in a second FIFO 100.

To ensure an accurate time-of-arrival (TOA) time stamp, the receive start of cell signal indicated at 96 must be synchronous with a recovered network clock signal. To assure that the start of cell signal 96 is synchronous, care must be taken to avoid selection of certain commercially-available physical layer devices for receiver 90, which themselves contain rate-decoupling FIFOs between the network port RX1 and the UTOPIA bus. Such rate-decoupling FIFOs introduce a variable time delay between their input and output ports. By comparison, the rate-decoupling FIFO 92 shown in FIG. 6 is provided after the UTOPIA bus in the cell flow path, in order to hold the cell while the time stamp is written into the appended data FIFO 100. The cell is then read from the rate-decoupling FIFO 92 at a rate faster than the input rate, synchronism thus being recovered.

Referring now to the components of the lower portion of FIG. 6, a cell time-of-departure (TOD) time stamp 106 must similarly be provided by a second timer 102 synchronous to the network transmit clock signal. The test instrument may comprise multiple ATM cell sources as shown, each producing cells for transmission but asynchronous to one another, e.g., ATM test cell source 82, ATM OAM cell source 84, or other ATM sources 86, the latter providing received cells to be transmitted without alteration, e.g., cells not belonging to a virtual connection being tested. A transmit cell stream time division multiplexer 80 is used to select a cell from one of these sources for transmission in each cell slot. Cell sources 82, 84, and 86 and multiplexer 80 may also be employed when the instrument is used to practice the invention in copending Ser. No. 08/560,117. A transmit cell stream multiplexer 80 as used conforming to the UTOPIA bus 87 provides a transmit start of cell signal 89 used to synchronize the sampling of the timer 102 to the network transmit clock signal. In order to maintain association between each transmitted cell and its cell TOD stamp, the TOD stamp is injected into the cell payload, overwriting any corresponding data within the cell payload. Injection of the time stamp is performed after the cell is transmitted by multiplexer 80, as the cell crosses the transmit UTOPIA bus 87, that is, between multiplexer 80 and transmit physical layer device 88.

Stated differently, therefore, the instrument of the invention employs commercially-available circuit components conforming to the industry-standard UTOPIA bus to transmit a cell including a TOD stamp, and to delineate the cells on the receive side. A cell filter examining at least the VPI and VCI of each cell, and possibly additional portions of the headers and payloads as well, identifies the cells of interest, e.g., belonging to a virtual connection to be tested. A rate-decoupling FIFO is provided to store the cells in order to provide time for their examination by the cell filter, and for a TOA time stamp to be appended at 98. A microprocessor 104 then compares the cell TOD from the cell payload to the appended TOA to determine RTT.

In typical operation of the device shown in FIG. 6, a series of cells all pertaining to the same virtual connection are injected with TOD time stamps by timer 102 and transmitted by physical layer device 88. A second test instrument connected at a remote node along the virtual connection detects these test cells, essentially in accordance with the cell filter function described above and in further detail in copending Ser. No. 08/560,117 and loops these back to the instrument of FIG. 6. The test cells are detected, and TOA time stamps appended. The time difference between the injected TOD time stamp and the appended cell TOA time stamp of each cell is measured by the microprocessor 104. This provides a direct measurement of the round trip travel time of each cell between the first and second instruments and its return to the first instrument.

In most cases, when it is desired to perform RTT measurements, all cells transmitted with respect to a particular virtual connection will be test cells including time stamps. Such tests will typically be performed when the virtual connection is out of service, that is, fully configured but not in use for transmission of user cells. Proceeding in this manner, as distinguished from injecting cells including time stamps in a stream of user cells from the same virtual connection, eliminates the need for the cells to include bits allowing the instrument to distinguish between user cells and test cells.

In a preferred embodiment, the payload of each test cell may include a number of bits encoding the test cell type; these can then be examined by the cell filter to identify the test cells. When, as is preferred, test cells including time stamps are transmitted only when the virtual connection is out of service, the test cell type bits of the payload may take any desired form, again, as in these circumstances there is no need to distinguish such test cell payloads from payloads of user cells. Individual test cell identifiers, such as test cell sequence numbers, may also be added to test cell payloads, enabling identification of individual cells.

Furthermore, test cells including time stamps according to the invention can be configured as OAM cells (i.e., by setting the appropriate bits within the cell headers) with time stamps added thereto according to the invention. OAM-configured test cells are normally used to measure RTT of in-service connections, to avoid interference with user traffic. Such different types of test cells are provided by cell sources 82, 84 (FIG. 6).

More specifically, OAM cells may be configured as performance management (PM) and fault management (FM) cells. OAM-PM cells are delayed by intermediate nodes in the same manner as ordinary user cells and therefore are preferred for RTT measurement according to the invention.

By comparison, OAM-FM cells are treated differently by certain nodes, so that the RTT of test cells configured as OAM-FM cells may not be precisely indicative of the RTT of user cells.

As further indicated above, VS/VD-capable nodes are capable of looping-back RM cells; this facility is normally used to adjust the cell transmission rate of ABR virtual connections. As RTT measurements are typically used to set the cell rate of ABR virtual connections during their establishment, RM cells belonging to an established ABR virtual connection will typically not be used for RTT measurement according to the invention, although the automatic loopback of RM cells provided by VS/VD-capable nodes would allow RTT to be measured by a single test instrument. Similarly, while all cells belonging to a typical virtual connection can be loopedback at given nodes, by setting the node accordingly, allowing RTT to be measured by a single instrument, this is normally undesirable as it precludes user traffic over that connection. However, both possibilities are within the scope of the invention.

The round trip travel time as thus determined according to the invention can be used to determine the number of cells "in flight" at any given time, allowing determination of the actual numbers of cells in the network. This information can then be used, for example, by a network administrator in correctly optimizing ABR cell rates to most efficiently use the bandwidth and node buffer space available in the network.

Conclusion

It will be apparent that the capability of the test instrument of the invention to detect cells from a particular virtual connection is critical to its utility in monitoring RTT. Only a test instrument having the ability to identify cells by their VPI and VCI according to the invention can measure RTT with respect to particular virtual connections. The ability to inject test cells configured as OAM cells allows further flexibility, in measuring RTT as to both in-service and out-of-service virtual connections.

While a preferred embodiment of the invention has been described in detail, and examples of its operation have been given, it will be appreciated by those of skill in the art that these are merely exemplary and that other implementations of various aspects of the invention are also within its scope and extent. The invention is therefore not to be limited by the above exemplary disclosure, but only by the following claims.

What is claimed is:

1. A method for measuring the round-trip travel time (RTT) of cells in an asynchronous transfer mode (ATM) communication network, wherein messages to be transmitted are divided at their source into one or more user cells, each user cell comprising a header of predetermined format and a payload of predetermined length, said header including message type, message priority, and virtual path identifier (VPI) and virtual channel identifier (VCI) routing information, each user cell of a given message being transmitted over a single virtual connection between its source and destination, comprising the steps of:

interposing a first test instrument in the traffic flow path at a first node in said network, said first instrument being capable of transmitting test cells having headers identical to user cells corresponding to a particular virtual connection of interest, said test cells including in their payloads a time stamp indicative of the time of transmission of each said test cell, and said first test instrument being capable of detecting said test cells including time stamps by examining the VPI and VCI information of each cell passing through said first node to identify those corresponding to a particular virtual connection of interest;

interposing a second test instrument in the traffic flow path at a second node, said second instrument being capable of detecting said test cells including said time stamps received at said second node by examining the VPI and VCI information of each cell passing through said second node to identify those corresponding to said particular virtual connection of interest;

employing said first instrument to transmit said test cells including time stamps from said first to said second node;

employing said second instrument to detect said test cells including time stamps, and to loop back test cells thus identified over the network; and employing said first instrument to detect the looped-back test cells at said first node, and for determining the RTT of user cells of said particular virtual connection of interest by comparison of the time stamps indicative of the time of transmission with the time of receipt.

2. The method of claim 1, comprising the further step of employing said first instrument to append a second time stamp indicative of the time-of-arrival of said looped-back cells thereto, and wherein said step of determining the RTT thereof is performed by comparing said plural time stamps.

3. The method of claim 1, wherein said time stamps are also added to operations, administration and maintenance (OAM)-configured cells forming part of a stream of traffic over a virtual connection between said first node and said second node, to measure the RTT of cells transmitted therebetween.

4. The method of claim 1, wherein one or both of said first and second nodes with respect to which the RTT of a particular cell is measured are comprised by intermediate nodes having virtual source/virtual destination capability, such that the RTT can be measured with respect to cells traveling between (1) a source and an intermediate node operated as a virtual destination node, (2) intermediate nodes operated as virtual source and virtual destination nodes, or (3) an intermediate node operated as a virtual source and a destination node.

5. An instrument for measuring the round-trip travel time (RTT) of user cells corresponding to a specified virtual connection having been established in an asynchronous transfer mode (ATM) communication network, wherein messages to be transmitted are divided at their source into one or more user cells, each user cell comprising a header of predetermined format and a payload of predetermined length, said header including message type, message priority, and virtual path identifier (VPI) and virtual channel identifier (VCI) routing information, each user cell of a given message being transmitted over a predetermined virtual connection between its source and destination, comprising:

means for interposing said instrument in the traffic flow path of cells through a first node in said network;

means for transmitting test cells corresponding to specific virtual connections established over said network by adding a time stamp indicative of the time of transmission of a cell to said transmitted cells, said test cells having headers identical to user cells corresponding to a particular virtual connection of interest;

said instrument being intended for use in conjunction with a second instrument located at a second node in said network, said second instrument comprising means for detecting said test cells including said time stamps by examining the VPI and VCI information of each cell passing through said second node to identify those corresponding to said particular virtual connection of interest, and for looping-back cells thus identified over the network; and said first instrument further comprising means for detecting the looped-back cells at said first node by examining the VPI and VCI information of each cell passing through said first node to identify those corresponding to said particular virtual connection of interest, and determining the RTT thereof.

6. The instrument of claim 5, wherein said cells including time stamps may additionally be configured as operations, administration and maintenance cells forming part of a stream of traffic over a virtual connection between said source and said destination, to measure the RTT of cells therebetween.

7. The instrument of claim 5, wherein time stamps are placed in the payloads of said cells.

8. In combination, the instrument of claim 5, and a second generally similar instrument for connection to a second node for detecting cells including said time stamps transmitted by said first instrument, and looping said identified cells back to said first instrument.

9. The instrument of claim 5, wherein one or both of said first and second nodes with respect to which the RTT of a particular cell is measured are comprised by intermediate nodes having virtual source/virtual destination capability, such that said instruments can measure the RTT with respect to cells traveling between (1) a source and an intermediate node operated as a virtual destination node, (2) intermediate nodes operated as virtual source and virtual destination nodes, or (3) an intermediate node operated as a virtual source and a destination node.

10. A method for measuring the round-trip travel time (RTT) of cells in an asynchronous transfer mode (ATM) communication network, wherein messages to be transmitted are divided at their source into one or more user cells, each user cell comprising a header of predetermined format and a payload of predetermined length, said header including message type, message priority, and virtual path identifier (VPI) and virtual channel identifier (VCI) routing information, each user cell making up a given message being transmitted over a single virtual connection between its source and destination, comprising the steps of:

connecting a first test instrument in the traffic flow path at a first node in said network, said first instrument performing the following steps:

examining a stream of cells received by said first node, identifying cells belonging to a particular virtual connection of interest by examining the VPI and VCI information of each cell passing through said first node, adding a time stamp indicative of the time of transmission of each cell to said identified cells, and transmitting said identified cells including time stamps in said stream of cells;

providing a second instrument at a second node to detect said cells including time stamps by examining the VPI and VCI information of each cell passing through said second node to identify cells corresponding to said virtual connection of interest, and then examining said identified cells to identify the time stamps thereof, and to loop back cells thus identified over the network; and employing said first instrument to detect the looped-back cells by examining the VPI and VCI information of each cell passing through said first node to identify cells corresponding to said virtual connection of interest, and to determine the RTT thereof.

11. The method of claim 10, wherein said time stamps are placed in the payloads of said cells.

12. The method of claim 10, comprising the further step of employing said first instrument to append a second time stamp indicative of the time-of-arrival of said looped-back cells thereto, and wherein said step of determining the RTT thereof is performed by comparing said plural time stamps.

13. The method of claim 10, wherein one or both of said first and second nodes with respect to which the RTT of a particular cell is measured are comprised by intermediate nodes having virtual source/virtual destination capability, such that the RTT can be measured with respect to cells traveling between (1) a source and an intermediate node operated as a virtual destination node, (2) intermediate nodes operated as virtual source and virtual destination nodes, or (3) an intermediate node operated as a virtual source and a destination node.

14. The method of claim 10, wherein said time stamps are added to cells configured as operations, administration, and maintenance cells forming part of a stream of traffic over a virtual connection between said first node and said second node, to measure the RTT of cells transmitted therebetween.

15. The method of claim 10, wherein said means provided at a second node to detect and loop back cells comprises a second test instrument.

* * * * *